United States Patent
Ribarov et al.

(10) Patent No.: US 9,908,706 B1
(45) Date of Patent: Mar. 6, 2018

(54) ELECTRIC MOTOR POWER DRIVE UNIT FOR AN AIRCRAFT CARGO HOLD FLOOR SYSTEM

(71) Applicant: Goodrich Corporation, Charlotte, NC (US)

(72) Inventors: Lubomir A. Ribarov, West Hartford, CT (US); Jacek F. Gieras, Jr., Glastonbury, CT (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/291,896

(22) Filed: Oct. 12, 2016

(51) Int. Cl.
*B65G 13/06* (2006.01)
*B64D 9/00* (2006.01)

(52) U.S. Cl.
CPC ............ *B65G 13/06* (2013.01); *B64D 9/00* (2013.01); *B64D 2009/006* (2013.01); *B65G 2814/0398* (2013.01)

(58) Field of Classification Search
CPC ...... B65G 13/06; B65G 13/065; B65G 13/02; B65G 13/04; B64D 9/00; B64D 2009/006
USPC ............. 198/780–791, 832–835; 244/137.1
See application file for complete search history.

(56) References Cited

U.S. PATENT DOCUMENTS

| | | | |
|---|---|---|---|
| 1,840,574 A * | 1/1932 | Fitch ................... | B65G 63/025 198/791 |
| 1,898,551 A * | 2/1933 | MacCutcheon ....... | B21B 39/008 198/788 |
| 3,690,440 A | 9/1972 | Macpherson | |
| 3,737,022 A | 6/1973 | DeNeefe et al. | |
| 3,978,975 A | 9/1976 | Herbes et al. | |
| 4,589,542 A | 5/1986 | Steadman | |
| 4,640,409 A * | 2/1987 | Holtman ............... | B65H 5/062 198/624 |
| 4,949,837 A * | 8/1990 | Huber ..................... | B64D 9/00 198/782 |
| 4,960,186 A * | 10/1990 | Honda ................. | B66B 11/0438 187/254 |
| 5,020,657 A * | 6/1991 | Huber ..................... | B64D 9/00 198/782 |
| 5,145,169 A * | 9/1992 | Kato ..................... | B65H 5/062 198/788 |
| 5,547,069 A | 8/1996 | Pritchard | |

(Continued)

FOREIGN PATENT DOCUMENTS

EP 0355251 2/1990
EP 527993 10/2004

*Primary Examiner* — William R Harp
(74) *Attorney, Agent, or Firm* — Snell & Wilmer L.L.P.

(57) ABSTRACT

A power drive unit (PDU) may comprise a first motorized roller comprising an outer rotor having a first magnetic member disposed on a radially inner surface of the outer rotor and may have a liner disposed on a radially outer surface of the outer rotor. The PDU may further comprise an inner rotor having a second magnetic member disposed on a radially outer surface of the inner rotor, the inner rotor configured to drive a shaft. The PDU may further comprise a stator located between the outer rotor and the inner rotor, the stator having at least one winding in electromagnetic communication with the first magnetic member and the second magnetic member. The PDU may further comprise a second motorized roller comprising a cylindrical member coupled to the shaft and may have a second liner disposed on a radially outer surface of the cylindrical member.

17 Claims, 4 Drawing Sheets

(56) References Cited

U.S. PATENT DOCUMENTS

| | | | |
|---|---|---|---|
| 7,673,738 B2 | 3/2010 | McConnell | |
| 7,717,252 B2 | 5/2010 | Stewart | |
| 8,899,516 B2 | 12/2014 | Ribarov | |
| 8,960,418 B2 * | 2/2015 | Rathmann | B65G 39/02 |
| | | | 198/835 |
| 8,973,866 B2 | 3/2015 | Ribarov | |
| 9,340,276 B2 | 5/2016 | Schneider | |
| 2004/0144622 A1 | 7/2004 | Leingang et al. | |
| 2006/0192453 A1 | 8/2006 | Gieras et al. | |
| 2013/0181562 A1 | 7/2013 | Gieras et al. | |
| 2014/0008915 A1 * | 1/2014 | Ribarov | F03D 1/025 |
| | | | 290/55 |
| 2014/0367227 A1 | 12/2014 | Schneider | |

* cited by examiner

ELECTRIC MOTOR POWER DRIVE UNIT FOR AN AIRCRAFT CARGO HOLD FLOOR SYSTEM

FIELD

The disclosure generally relates to aircraft cargo hold systems, and more particularly to the design of a motor power drive unit for an aircraft cargo hold floor system.

BACKGROUND

Aircraft used for the transport of cargo usually have cargo doors at a side of the aircraft. A loader may load a unit load device (ULD) into the aircraft through one of the cargo doors. In an area in the vicinity of the door inside the aircraft, motorized devices in the floor of the cargo hold are able to pull the ULD into the aircraft and then direct it to the final storage and transportation location, where it may be locked in place. The ULD may be moved forwards or aft by motorized rollers, or power drive units (PDUs), in the floor.

SUMMARY

In various embodiments, a power drive unit (PDU) is disclosed. A PDU may comprise a first motorized roller comprising an outer rotor having a first magnetic member disposed on a radially inner surface of the outer rotor, the first motorized roller configured to rotate about an axis, a second motorized roller comprising a cylindrical member coupled to a shaft, the cylindrical member configured to rotate with the shaft about the axis, an inner rotor having a second magnetic member disposed on a radially outer surface of the inner rotor, the inner rotor configured to drive the shaft, and a stator located between the outer rotor and the inner rotor, the stator having at least one winding in electromagnetic communication with the first magnetic member and the second magnetic member.

In various embodiments, the PDU may further comprise a first liner disposed on a radially outer surface of the outer rotor, and a second liner disposed on a radially outer surface of the cylindrical member. The PDU may further comprise a stationary frame, the stator being fixed to the stationary frame, wherein the stationary frame comprises a first cutout for the first motorized roller and comprises a second cutout for the second motorized roller. At least a portion of the first liner may extend through the first cutout and at least a portion of the second liner may extend through the second cutout. The first magnetic member, the second magnetic member, and the stator, may be axially in line, the first magnetic member located radially outward from the stator and the second magnetic member located radially inward from the stator. The PDU may comprise an induction motor and at least one of the first magnetic member and the second magnetic member may comprise a cage winding. The PDU may comprise a permanent magnet radial flux brushless motor and at least one of the first magnetic member and the second magnetic member may comprise a permanent magnet (PM). The PDU may comprise at least one of a switched reluctance motor (SRM), a stepping motor, and a flux-switching motor and at least one of the first magnetic member and the second magnetic member may comprise at least one of a salient ferromagnetic pole and a ferromagnetic teeth.

In various embodiments, a PDU is disclosed. A PDU may comprise an outer rotor having a first magnetic member disposed on a radially inner surface of the outer rotor, the outer rotor coupled to a hollow shaft, the outer rotor configured to rotate about an axis, an inner shaft configured to rotate about the axis, the inner shaft located concentrically with respect to the hollow shaft and extending into at least a portion of the hollow shaft, an inner rotor having a second magnetic member disposed on a radially outer surface of the inner rotor, the inner rotor configured to drive the shaft, a stator located between the outer rotor and the inner rotor, the stator having at least one winding in electromagnetic communication with the first magnetic member and the second magnetic member, a first motorized roller coupled to the hollow shaft and configured to rotate with the hollow shaft, and a second motorized roller coupled to the inner shaft and configured to rotate with the shaft about the axis.

In various embodiments, the PDU may further comprise a first liner disposed on a radially outer surface of the first motorized roller, and a second liner disposed on a radially outer surface of the second motorized roller. The PDU may further comprise a stationary frame, the stator being fixed to the stationary frame, wherein the stationary frame comprises a first cutout for the first motorized roller and comprises a second cutout for the second motorized roller. At least a portion of the first liner may extend through the first cutout and at least a portion of the second liner may extend through the second cutout. The first magnetic member, the second magnetic member, and the stator, may be axially in line, the first magnetic member located radially outward from the stator and the second magnetic member located radially inward from the stator. The PDU may comprise an induction motor and at least one of the first magnetic member and the second magnetic member may comprise a cage winding. The PDU may comprise a permanent magnet radial flux brushless motor and at least one of the first magnetic member and the second magnetic member may comprise a permanent magnet (PM). The PDU may comprise at least one of a switched reluctance motor (SRM), a stepping motor, and a flux-switching motor and at least one of the first magnetic member and the second magnetic member may comprise at least one of a salient ferromagnetic pole and a ferromagnetic teeth.

In various embodiments, a roller for a PDU for a cargo hold floor of an aircraft is disclosed. A roller for a PDU for a cargo hold floor of an aircraft may comprise a cylindrical member, a hollow shaft extending from the cylindrical member, the hollow shaft and the cylindrical member in concentric alignment, and a liner disposed on a radially outer surface of the cylindrical member.

In various embodiments, the roller may further comprise a magnetic member disposed on a radially inward surface of the cylindrical member. The magnetic member may comprise at least one of a cage winding, a permanent magnet (PM), a salient ferromagnetic pole, and a ferromagnetic tooth. The liner may comprise a polymeric material.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. §101.

As used herein, "electromagnetic communication" means communication of electromagnetic signals without physical coupling and via an electromagnetic field (e.g., "inductive communication" or "inductively coupled" or "inductive coupling").

As used herein, "electronic communication" means communication of electronic signals with physical coupling (e.g., "electrical communication" or "electrically coupled").

Power drive units (PDUs), as described herein, may be robust, compact, and reliable for cargo handling in aircraft cargo hold floors. PDUs of the present disclosure may provide weight savings and reduced parts count.

Figure 1:
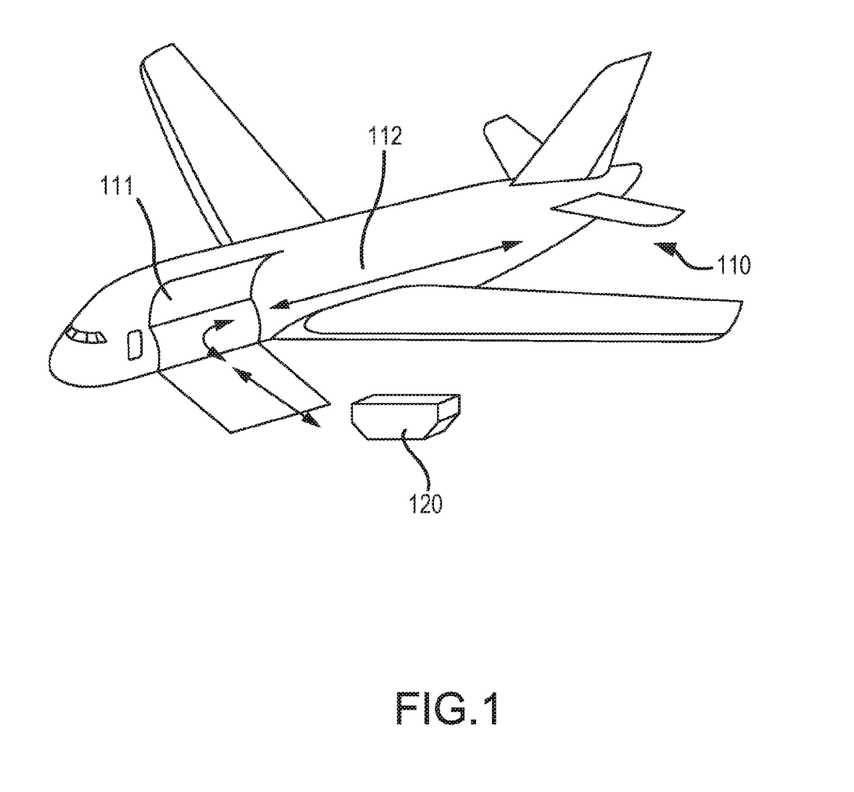
- FIG. 1 illustrates a schematic view of an aircraft being loaded with cargo, in accordance with various embodiments.

With reference to FIG. 1, a schematic view of an aircraft 110 having a cargo hold 112 is illustrated, in accordance with various embodiments. The aircraft 110 may comprise a cargo load door 111 at one side of the fuselage structure of the aircraft 110. Through the cargo load door 111, cargo may be loaded into the cargo hold 112 of the aircraft 110 or unloaded from the cargo hold 112 of the aircraft 110.

Items to be shipped by air are typically loaded first onto specially configured pallets or into specially configured containers. In aviation, those various pallets and/or containers commonly are referred to as Unit Load Devices (ULDs). ULDs are available in various sizes and capacities, and are typically standardized in dimension and shape. A ULD—in the example of FIG. 1 a ULD 120—usually is loaded with cargo at a location other than the immediate vicinity of the aircraft 110. Once loaded with cargo items, the ULD is transferred to the aircraft, and is loaded onto the aircraft 110 through the cargo load door 111 using a conveyor ramp, scissor lift, or the like. Once inside the aircraft 110, the ULD is moved within the cargo hold to its final stowage position. Multiple ULDs may be brought on-board the aircraft, with each ULD being placed in its respective stowage and transportation position in the cargo hold 112. After the aircraft 110 has reached its destination, the ULDs are unloaded from the aircraft 110 similarly, but in reverse sequence to the loading procedure.

To facilitate movement of a ULD within the cargo hold 112, the floor of the cargo hold 112 may include actively driven motorized roller components that engage with the bottom of the ULD. Particularly, in the vicinity of the cargo load door 111, roller components may both move the ULD through the cargo load door 111 perpendicular to the longitudinal axis 400 (with momentary reference to FIG. 4) of the aircraft 110 and within the cargo hold 112 of the aircraft 110 parallel to the main axis of the aircraft 110.

Figure 2A:
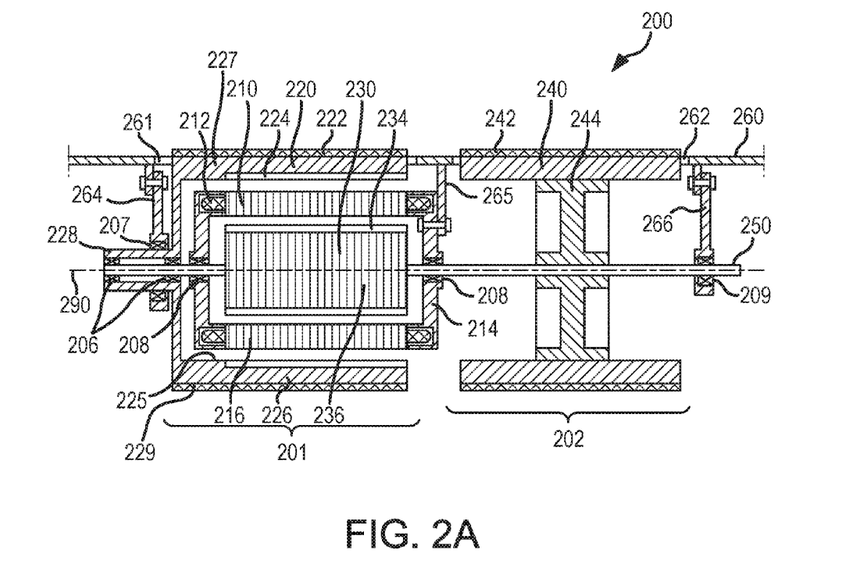
FIG. 2A illustrates a schematic view of a power drive unit (PDU) for a cargo hold floor of an aircraft in side view, in accordance with various embodiments.
Figure 2B:
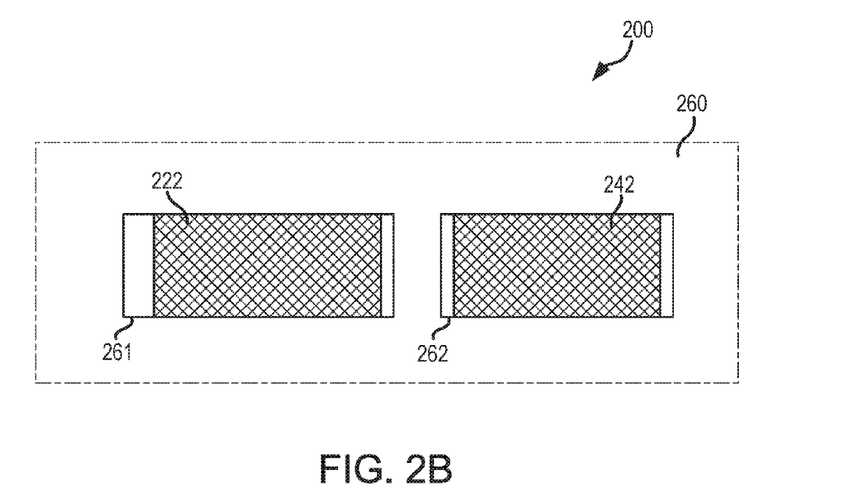
FIG. 2B illustrates a schematic view of a PDU for a cargo hold floor of an aircraft in top view, in accordance with various embodiments.

With reference to FIG. 2A and FIG. 2B, a schematic view of a PDU 200, in side view and in top view, respectively, is illustrated, in accordance with various embodiments. The PDU 200 may for example be employed in cargo hold floors of aircraft, such as the aircraft 110 of FIG. 1. In particular, the PDU 200 may be employed in cargo loading areas in the vicinity of a cargo load door, such as the cargo load door 111 of FIG. 1.

Roller components which may be actively driven to convey a ULD on the cargo hold floor are generally referred to as PDUs (200 in FIG. 2). The ULDs may sit atop the PDUs 200 that enable rolling movement of the ULDs within the cargo hold 112. PDUs as disclosed herein may be any type of electrically powered rollers that may be selectively energized to propel or drive a ULD in a desired direction over the floor of a cargo hold 112 of an aircraft 110.

PDU 200 may comprise a first motorized roller 201 and a second motorized roller 202. First motorized roller 201 and a second motorized roller 202 may be configured to rotate about axis 290. In various embodiments, first motorized roller 201 may comprise outer rotor 220. In various embodiments, second motorized roller 202 may comprise cylindrical member 240. PDU 200 may comprise a stator 210, an outer rotor 220, an inner rotor 230, a shaft (also referred to herein as an inner shaft) 250, and a stationary frame 260. Stator 210 may comprise a ferromagnetic core 216. Stator 210 may comprise stator windings 212. Stator 210 may be coupled to shaft 250 via support member 214. Support member 214 may extend radially inward towards axis 290. Bearings 208 may be located between support member 214 and shaft 250. Stator 210 may be fixed to stationary frame 260 via stationary support member 265. Stator 210 may be removably coupled to stationary frame 260 via stationary support member 265. Stationary frame 260 may be substantially flush with cargo hold floor 415 (with brief reference to FIG. 4).

In various embodiments, stator windings 212 may comprise one winding, the one winding coupled to a power signal. In various embodiments, stator windings 212 may comprise two windings, each winding coupled to separate power signals. As should be appreciated, outer rotor 220 and inner rotor 230 may be simultaneously rotated at different rates, in response to stator windings 212 comprising two windings, each coupled to separate power signals of different frequencies. In various embodiments, first motorized roller 201 and a second motorized roller 202 may each rotate about axis 290 at a similar rate, for example at the same rotational speed. In various embodiments, first motorized roller 201 and a second motorized roller 202 may each rotate about axis 290 at different rates. Further, first motorized roller 201 and a second motorized roller 202 may each rotate about axis 290 in the same rotational direction or in different rotational directions. For example, first motorized roller 201 and a second motorized roller 202 may contra-rotate to turn a ULD. In this regard, stator windings 212 may be in electronic communication with a power source, such as a variable frequency power source for example, as should be appreciated. In this regard, PDU 200 may comprise a double rotor electric motor.

Outer rotor 220 may comprise a ferromagnetic core 226. Outer rotor 220 may rotate about centerline axis 290. Outer rotor 220 may comprise a cylindrical member 227 coupled to a hollow shaft 228. Hollow shaft 228 may be disposed concentrically with respect to shaft 250. Cylindrical member 227 may comprise a greater maximum diameter than the maximum diameter of hollow shaft 228. Hollow shaft 228 may extend from cylindrical member 227. Hollow shaft 228 and cylindrical member 227 may be in concentric alignment. Hollow shaft may be rotatably supported between stationary support member 264, via bearing 207, and shaft 250, via bearings 206.

Outer rotor 220 may be located radially outward from stator 210. In this regard, outer rotor 220 may radially surround stator 210. Outer rotor 220 may comprise a liner (also referred to herein as a first liner) 222. Liner 222 may comprise a polymeric material, such as rubber, for example. At least a portion of liner 222 may extend through first cutout 261. Liner 222 may be disposed on a radially outer surface 229 of outer rotor 220. In this regard, first cutout 261 may be configured to accommodate first motorized roller 201. Outer rotor 220 may be coupled to shaft 250 via bearings 206. Outer rotor 220 may rotate relative to shaft 250. In this regard, shaft 250 and outer rotor 220 may each independently rotate about axis 290. Outer rotor 220 may be coupled to stationary frame 260 via stationary support member 264. Outer rotor 220 may be coupled to stationary support member 264 via bearings 207.

Outer rotor 220 may comprise a magnetic member (also referred to herein as a first magnetic member) 224. Magnetic member 224 may be disposed on a radially inner surface 225 of outer rotor 220. Magnetic member 224 may be in electromagnetic communication with stator 210. Magnetic member 224 may comprise a permanent magnet (PM). Magnetic member 224 may comprise a PM in response to PDU 200 comprising a PM radial flux brushless motor. Magnetic member 224 may comprise a salient ferromagnetic pole and/or ferromagnetic teeth. Magnetic member 224 may comprise a salient ferromagnetic pole and/or ferromagnetic teeth in response to PDU 200 comprising a switched reluctance motor (SRM), a stepping motor, or a flux-switching motor. Magnetic member 224 may comprise cage windings, made from aluminum or copper for example. Magnetic member 224 may comprise cage windings in response to PDU 200 comprising an induction motor (IM).

Inner rotor 230 may comprise a ferromagnetic core 236. Inner rotor 230 may comprise a magnetic member (also referred to herein as a second magnetic member) 234. Magnetic member 234 may be in electromagnetic communication with stator 210. Magnetic member 234 may be similar to magnetic member 224. Magnetic member 234 may be disposed on the radially outer surface of inner rotor 230. Inner rotor 230 may be coupled to shaft 250. Inner rotor 230 may drive shaft 250. In this regard, inner rotor 230 may rotate with shaft 250.

Second motorized roller 202 may be formed by support member 244, cylindrical member 240, and liner (also referred to herein as a second liner) 242. In this regard, support member 244 may be mechanically coupled to shaft 250. Support member 244 may rotate with shaft 250. Support member 244 may extend from shaft 250. Cylindrical member 240 may be mechanically coupled to support member 244. Liner 242 may be disposed over the radially outer surface of cylindrical member 240. At least a portion of liner 242 may extend through second cutout 262. In this regard, second cutout 262 may be configured to accommodate second motorized roller 202. Stationary support member 266 may extend from stationary frame 260. Shaft 250 may be rotatably coupled to stationary support member 266, via bearing 209.

Figure 3A:
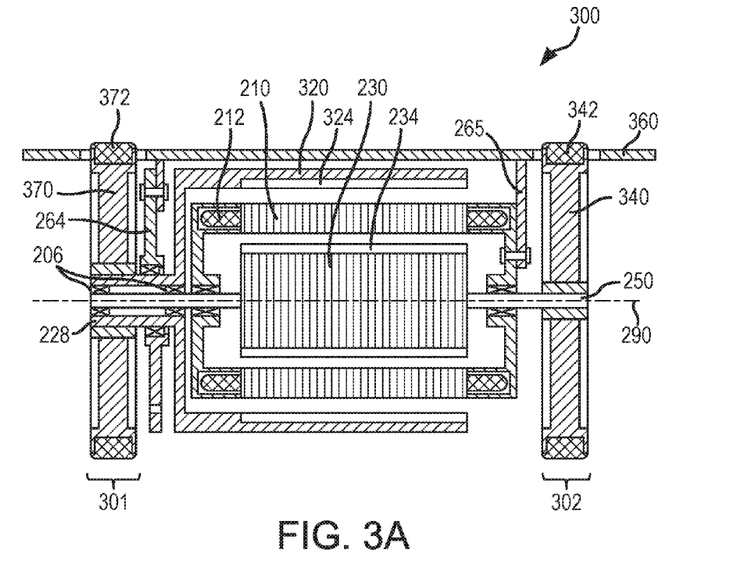
FIG. 3A illustrates a schematic view of a PDU for a cargo hold floor of an aircraft in side view, in accordance with various embodiments.
Figure 3B:
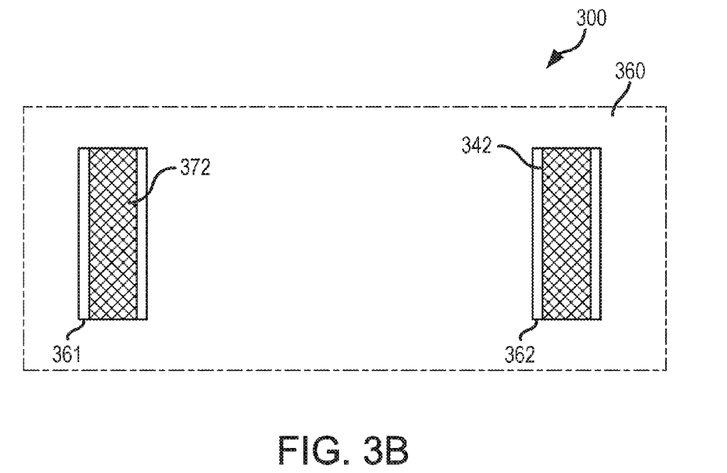
FIG. 3B illustrates a schematic view of a PDU for a cargo hold floor of an aircraft in top view, in accordance with various embodiments.

With reference to FIG. 3A and FIG. 3B, a schematic view of a PDU 300, in side view and in top view, respectively, is illustrated, in accordance with various embodiments. In various embodiments, PDU 300 may be similar to PDU 200. With respect to FIG. 3A, elements with like element numbering, as depicted in FIG. 2A, are intended to be the same and will not necessarily be repeated for the sake of clarity.

In contrast to PDU 200 (see FIG. 2A), first motorized roller 301 comprises a cylindrical member 370 extending from hollow shaft 228. First motorized roller 301 is located axially adjacent to stator 210, as opposed to axially in line with stator 210 as provided in PDU 200 of FIG. 2A. In this regard, hollow shaft 228 extends along axis 290, away from inner rotor 230. Liner (also referred to herein as a first liner) 372 may be disposed on the radially outer surface of cylindrical member 370.

Outer rotor 320 may comprise a magnetic member 324. Outer rotor 320 may be coupled to and may rotate with hollow shaft 228. In various embodiments, outer rotor 320 may be located radially inward from stationary frame 360.

Second motorized roller 302 may comprise cylindrical member 340, and liner 342. Cylindrical member 340 may be mechanically coupled to shaft 250. Cylindrical member 340 may rotate with shaft 250. Cylindrical member 340 may extend from shaft 250. Liner 342 may be disposed over the radially outer surface of cylindrical member 340. At least a portion of liner 342 may extend through second cutout 362.

Figure 4:
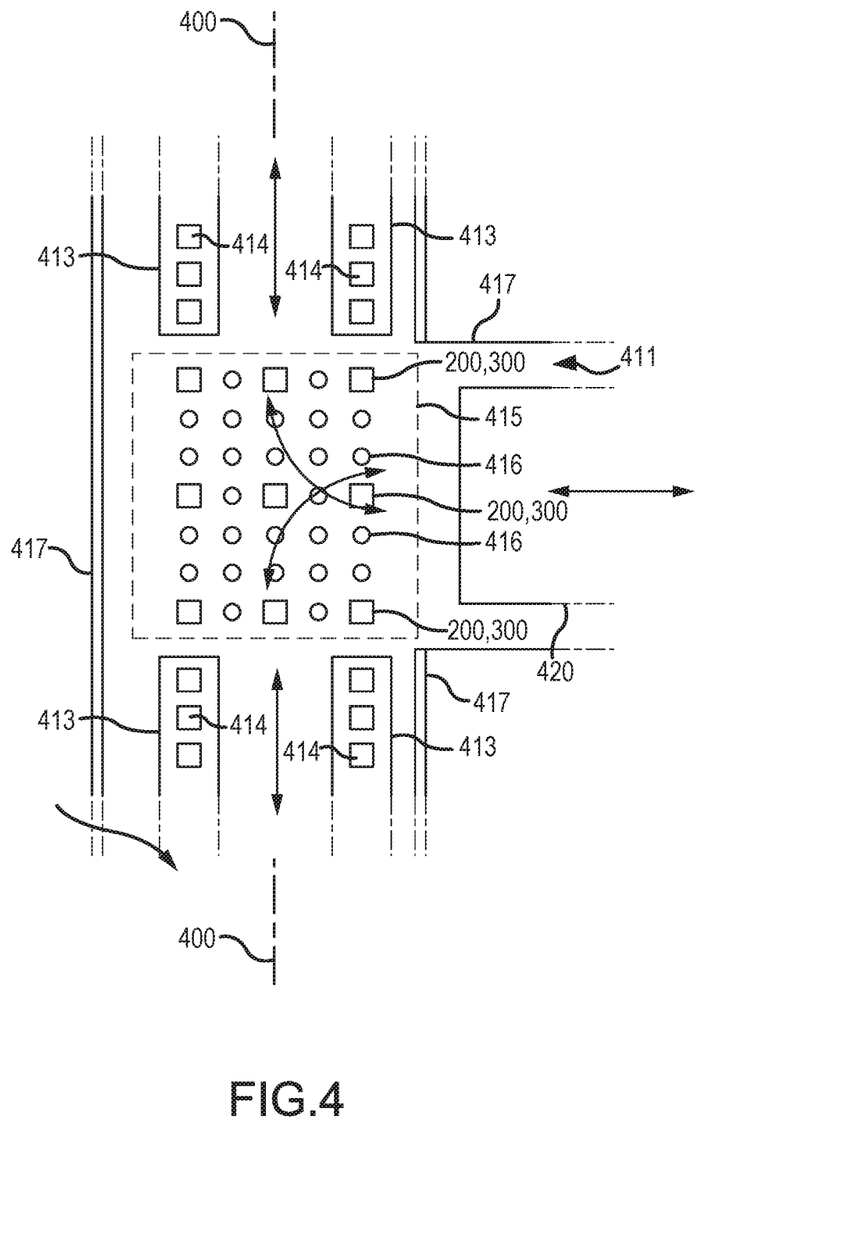
FIG. 4 illustrates a cargo hold floor for an aircraft having multiple PDUs, in accordance with various embodiments.

With reference to FIG. 4, a schematic illustration of a part of a cargo hold of an aircraft, for example the cargo hold 112 of the aircraft 110 in FIG. 1, is illustrated, in accordance with various embodiments. The aircraft is delimited by an aircraft hull 417 which opens on one side to a cargo load door 111. A ULD 420 is indicated as being loaded into the cargo hold.

A cargo hold floor 415 is located in a cargo loading area in the vicinity of a cargo load door 111 of the aircraft. The cargo hold floor 415 may comprise a plurality of PDUs 200 which are generally arranged in a matrix arrangement, the respective motorized rollers 201 and 202 (see FIG. 2A) of the PDUs 200 protruding from the surface of the cargo hold floor 415 in order to engage with the bottom of the ULD 420 as it is guided onto the cargo hold floor 415. The axis 290 (see FIG. 2A) of the PDUs 200 may be arranged to be parallel to the longitudinal axis 400 of the aircraft. Of course, other arrangements of the axis 290 of the PDUs 200 with regard to the longitudinal axis 400 of the aircraft may be possible as well, for example a perpendicular arrangement of the axis 290 of the PDUs 200 with regard to the longitudinal axis 400 of the aircraft.

A plurality of roller elements 416 may be arranged between the plurality of PDUs 200 in a matrix arrangement as well. The roller elements 416 may be passive elements, for example roller ball units that serve as stabilizing and guiding means for the ULD 420 as it is conveyed on the cargo hold floor 415 by the PDUs 200.

The number of PDUs 200 and roller elements 416 is only exemplarily depicted in FIG. 4 and a different number and placement of the PDUs 200 and roller elements 416 may be chosen as well, depending on the respective application of the cargo hold floor 415 in the aircraft. Moreover, the positioning of the PDUs 200 and roller elements 416 may deviate from the standard rectangular matrix arrangement as well and may be adapted to the outer shape of the cargo hold floor 415, which may take other geometries as well.

The cargo hold floor 415 may be located between conveyor belts 413 having multiple conventional conveyor rollers 414 in order to convey ULDs 420 within the cargo hold parallel to the longitudinal axis 400 of the aircraft, once the ULD has been transferred from the cargo hold floor 415 to the conveyor belts 413. In various embodiments, conveyor belts 413 may comprise rails having fixed roller (passive and/or active), whereupon ULDs are moved along to their final stowage position inside the cargo hold 112 (with momentary reference to FIG. 1).

With reference to FIG. 2A, FIG. 3A, and FIG. 4, and assuming that as an example the axis 290 of the PDUs (i.e., PDU 200 and/or PDU 300) are arranged to be parallel to the longitudinal axis 400 of the aircraft. At first, the PDUs may be operated in the first operation mode where the first and second motorized rollers (i.e., first and second motorized rollers 201 and 202 or first and second motorized rollers 301 and 302) are operated with the same turning speed and the same turning direction. In that mode the ULD 420 will get pulled in through the cargo load door 411 with the PDUs propelling the ULD in a perpendicular direction to the longitudinal axis 400 of the aircraft.

When the ULD 420 is fully within the aircraft and ready to be stowed in the cargo hold 112 (see FIG. 1), the PDUs (i.e., PDU 200 and/or PDU 300) or at least part of the PDUs may be operated in the second operation mode where the first motorized roller (i.e., first motorized roller 201 or first motorized roller 301) is operated in the opposite turning direction than the second motorized roller (i.e., second motorized roller 202 or second motorized roller 302) to turn the ULD 420. Thus, the ULD 420 may be moved onto the conveyor belts 413 for further transfer by the rollers 414 into the cargo hold 112 (See FIG. 1) and the final stowage position in the aircraft. The direction of the sideways movement may be controlled by reversing both turning directions of the first and second motorized rollers 201 and 202 in the second operation mode.

In various embodiments, The PDUs may be operated in a third operation mode, where the first and second motorized rollers (i.e., first and second motorized rollers 201 and 202 or first and second motorized rollers 301 and 302) are operated with the same turning speed and the same turning direction but in a direction opposite to the turning direction as described in the first operation mode. In this third operation mode, the ULD 420 may be stopped when it has reached its final stowage position in the aircraft cargo hold 112. Therefore, in this third operation mode the proposed PDU (either according to FIG. 2A-2B or FIG. 3A-3B) can act as an effective brake for stopping the translating ULDs thereupon.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power drive unit (PDU) comprising:
   a first motorized roller comprising an outer rotor having a first magnetic member disposed on a radially inner surface of the outer rotor, the first motorized roller configured to rotate about an axis;
   a second motorized roller comprising a cylindrical member coupled to a shaft, the cylindrical member configured to rotate with the shaft about the axis;
   an inner rotor having a second magnetic member disposed on a radially outer surface of the inner rotor, the inner rotor configured to drive the shaft;
   a stator located between the outer rotor and the inner rotor, the stator having at least one winding in electromagnetic communication with the first magnetic member and the second magnetic member;
   a first liner disposed on a radially outer surface of the outer rotor; and
   a second liner disposed on a radially outer surface of the cylindrical member.

2. The PDU of claim 1, further comprising a stationary frame, the stator being fixed to the stationary frame, wherein the stationary frame comprises a first cutout for the first motorized roller and comprises a second cutout for the second motorized roller.

3. The PDU of claim 2, wherein at least a portion of the first liner extends through the first cutout and at least a portion of the second liner extends through the second cutout.

4. The PDU of claim 3, wherein the first magnetic member, the second magnetic member, and the stator, are axially in line, the first magnetic member located radially outward from the stator and the second magnetic member located radially inward from the stator.

5. The PDU of claim 4, wherein the PDU comprises an induction motor and at least one of the first magnetic member and the second magnetic member comprises a cage winding.

6. The PDU of claim 4, wherein the PDU comprises a permanent magnet radial flux brushless motor and at least one of the first magnetic member and the second magnetic member comprises a permanent magnet (PM).

7. The PDU of claim 4, wherein the PDU comprises at least one of a switched reluctance motor (SRM), a stepping motor, and a flux-switching motor and at least one of the first magnetic member and the second magnetic member comprises at least one of a salient ferromagnetic pole and a ferromagnetic teeth.

8. A power drive unit (PDU) comprising:
   an outer rotor having a first magnetic member disposed on a radially inner surface of the outer rotor, the outer rotor coupled to a hollow shaft, the outer rotor configured to rotate about an axis;
   an inner shaft configured to rotate about the axis, the inner shaft located concentrically with respect to the hollow shaft and extending into at least a portion of the hollow shaft;
   an inner rotor having a second magnetic member disposed on a radially outer surface of the inner rotor, the inner rotor configured to drive the shaft;
   a stator located between the outer rotor and the inner rotor, the stator having at least one winding in electromagnetic communication with the first magnetic member and the second magnetic member;
   a first motorized roller coupled to the hollow shaft and configured to rotate with the hollow shaft;
   a second motorized roller coupled to the inner shaft and configured to rotate with the shaft about the axis;
   a first liner disposed on a radially outer surface of the first motorized roller; and
   a second liner disposed on a radially outer surface of the second motorized roller.

9. The PDU of claim 8, further comprising a stationary frame, the stator being fixed to the stationary frame, wherein the stationary frame comprises a first cutout for the first motorized roller and comprises a second cutout for the second motorized roller.

10. The PDU of claim 9, wherein at least a portion of the first liner extends through the first cutout and at least a portion of the second liner extends through the second cutout.

11. The PDU of claim 10, wherein the first magnetic member, the second magnetic member, and the stator, are axially in line, the first magnetic member located radially outward from the stator and the second magnetic member located radially inward from the stator.

12. The PDU of claim 11, wherein the PDU comprises an induction motor and at least one of the first magnetic member and the second magnetic member comprises a cage winding.

13. The PDU of claim 11, wherein the PDU comprises a permanent magnet radial flux brushless motor and at least one of the first magnetic member and the second magnetic member comprises a permanent magnet (PM).

14. The PDU of claim 11, wherein the PDU comprises at least one of a switched reluctance motor (SRM), a stepping motor, and a flux-switching motor and at least one of the first magnetic member and the second magnetic member comprises at least one of a salient ferromagnetic pole and a ferromagnetic teeth.

15. A roller for a power drive unit (PDU) for a cargo hold floor of an aircraft comprising:
    a cylindrical member comprising a centerline axis;
    a hollow shaft extending from the cylindrical member, the hollow shaft and the cylindrical member in concentric alignment;
    a liner disposed on a radially outer surface of the cylindrical member; and
    a magnetic member disposed on a radially inward surface of the cylindrical member,
    wherein the hollow shaft is located externally from and axially adjacent to the cylindrical member.

16. The roller of claim 15, wherein the magnetic member comprises at least one of a cage winding, a permanent magnet (PM), a salient ferromagnetic pole, and a ferromagnetic tooth.

17. The roller of claim 16, wherein the liner comprises a polymeric material.

* * * * *